US012165793B2

(12) United States Patent
Li et al.

(10) Patent No.: US 12,165,793 B2
(45) Date of Patent: Dec. 10, 2024

(54) MAGNETIC BASE BODY CONTAINING METAL MAGNETIC PARTICLES AND ELECTRONIC COMPONENT INCLUDING THE SAME

(71) Applicant: TAIYO YUDEN CO., LTD., Tokyo (JP)

(72) Inventors: Xinyu Li, Tokyo (JP); Yoko Orimo, Tokyo (JP); Shinsuke Takeoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 739 days.

(21) Appl. No.: 16/534,339

(22) Filed: Aug. 7, 2019

(65) Prior Publication Data

US 2020/0051720 A1 Feb. 13, 2020

(30) Foreign Application Priority Data

Aug. 9, 2018 (JP) ................................ 2018-150210

(51) Int. Cl.

| | |
|---|---|
| ***H01F 1/147*** | (2006.01) |
| ***H01F 27/255*** | (2006.01) |
| ***H01F 27/28*** | (2006.01) |
| ***H01F 41/02*** | (2006.01) |

(52) U.S. Cl.

CPC ........... *H01F 1/147* (2013.01); *H01F 27/255* (2013.01); *H01F 27/2804* (2013.01); *H01F 41/0246* (2013.01); *H01F 2027/2809* (2013.01)

(58) Field of Classification Search

CPC ............. H01F 1/147; H01F 2027/2809; H01F 27/255; H01F 27/2804; H01F 41/0246; H01F 1/24; H01F 3/08

See application file for complete search history.

(56) References Cited

U.S. PATENT DOCUMENTS

| | | | | |
|---|---|---|---|---|
| 11,183,321 B2 * | 11/2021 | Ikeda | ........................ | H01F 1/33 |
| 2008/0044679 A1 * | 2/2008 | Maeda | ...................... | B22F 1/16 427/127 |
| 2010/0028195 A1 | 2/2010 | Maeda et al. | | |
| 2011/0285486 A1 * | 11/2011 | Maeda | ................... | B22F 1/102 335/297 |

(Continued)

FOREIGN PATENT DOCUMENTS

| | | |
|---|---|---|
| JP | 2006-179621 A | 7/2006 |
| JP | 2007-088156 A | 4/2007 |
| JP | 2010-034102 A | 2/2010 |

(Continued)

OTHER PUBLICATIONS

English Machine Translation: Higaki et al. (JP 2011-233827) (Year: 2011).*

(Continued)

*Primary Examiner* — Holly Rickman
*Assistant Examiner* — Linda N Chau
(74) *Attorney, Agent, or Firm* — Pillsbury Winthrop Shaw Pittman, LLP

(57) ABSTRACT

A magnetic base body according to an embodiment of the present invention includes a metal magnetic particle and an amorphous silicon oxide film provided on a surface of the metal magnetic particle, the amorphous silicon oxide film having a structural defect introduced therein.

14 Claims, 5 Drawing Sheets

(56) References Cited

U.S. PATENT DOCUMENTS

| | | | | |
|---|---|---|---|---|
| 2015/0099115 | A1* | 4/2015 | Maeda | H01F 27/255 252/62.53 |
| 2019/0131040 | A1 | 5/2019 | Ikeda et al. | |

FOREIGN PATENT DOCUMENTS

| | | | |
|---|---|---|---|
| JP | 2011-233827 | A | 11/2011 |
| JP | 2017-188678 | A | 10/2017 |
| WO | 2010/084812 | A1 | 7/2010 |
| WO | 2017/170901 | A1 | 10/2017 |

OTHER PUBLICATIONS

English Machine Translation: Shun et al. (JP 2018-129357) (Year: 2018).*

Notice of Reasons for Refusal dated Jan. 4, 2022, issued in corresponding Japanese Patent Application No. 2018-150210, with English translation (7 pgs.).

Notice of Reasons for Refusal dated Jun. 7, 2022, issued in corresponding Japanese Patent Application No. 2018-150210, with English translation (7 pgs.).

Notice of Reasons for Refusal dated Dec. 6, 2022, issued in corresponding Japanese Patent Application No. 2018-150210, with English translation (5 pgs.).

First Office Action dated Nov. 9, 2023, issued in corresponding Chinese Patent Application No. 201910688312.9 with English translation (14 pgs.).

Second Office Action dated May 28, 2024, issued in corresponding Chinese Patent Application No. 201910688312.9, with English translation (9 pgs.).

* cited by examiner

MAGNETIC BASE BODY CONTAINING METAL MAGNETIC PARTICLES AND ELECTRONIC COMPONENT INCLUDING THE SAME

CROSS-REFERENCE TO RELATED APPLICATIONS

This application is based on and claims the benefit of priority from Japanese Patent Application Serial No. 2018-150210 (filed on Aug. 9, 2018), the contents of which are hereby incorporated by reference in their entirety.

TECHNICAL FIELD

The present invention relates to a magnetic base body containing metal magnetic particles, and to an electronic component containing the magnetic base body.

BACKGROUND

Conventionally, various magnetic materials have been used as the material of the magnetic base body of the electronic component. For example, ferrite is often used as a magnetic material for coil component such as inductors. Ferrite is suitable as a magnetic material for an inductor because of its high permeability.

Metal magnetic materials composed of metal magnetic particles are known as magnetic materials for electronic components other than ferrite. In general, metal magnetic materials have higher saturation magnetic flux density than that of ferrite materials, hence suitable for the coil component's magnetic base body, through which a large current flows. For example, a magnetic base body made of composite magnetic materials, which contain metal magnetic particles, is prepared by pouring a slurry obtained by kneading metal magnetic particles and binder into a mold and performing pressure forming to the slurry in the mold. An insulating film is provided on the surface of each metal magnetic particles contained in the magnetic base body in order to prevent a short circuit between adjacent metal magnetic particles.

The magnetic base body for the electronic component is required to have high permeability. There have been proposals of techniques for increasing the filling factor of the magnetic particles in the magnetic base body to increase the magnetic permeability. For example, Japanese Patent Application Publication No. 2006-179621 discloses a composite magnetic material containing first magnetic particles and second magnetic particles. This publication discloses that a molded product having magnetic particles filled therein at a high density can be produced by satisfying the following conditions:

- the average particle size of the second magnetic particles is equal to or less than 50% of that of the first magnetic particles, and
- $0.05 \leq Y/(X+Y) \leq 0.30$, where X is the content (wt %) of the first magnetic particles, and Y is the content (wt %) of the second magnetic particles. Japanese Patent Application Publication 2010-34102 discloses a clay-like magnetic base body in which two or more kinds of amorphous metal magnetic particles having different average particle sizes and an insulating binder are mixed. According to this publication, it is believed that such a magnetic base body can realize a high filling factor and a low core loss.

It is conceivable to increase the filling factor of metal magnetic particles by raising the forming pressure at the time of forming the magnetic base body. However, there is a problem that once the forming pressure is increased, the insulating films provided on the surfaces of the metal magnetic particles are easily broken. When the insulating films are broken, adjacent metal magnetic particles are short-circuited, whereby the adjacent metal magnetic particles become large-diameter particles. In these large-diameter particles, eddy current is easily generated. Therefore, if dielectric breakdown occurs between the metal magnetic particles in the magnetic base body, there occurs a problem that the eddy current loss increases. In order to suppress the eddy current loss, it is desired that even if a high forming pressure is applied, the insulating films provided to the metal magnetic particles is not broken.

SUMMARY

The object of the present invention is to solve or alleviate at least part of the problem described above. One of the more specific objects of the present invention is to suppress the destruction of the insulating films provided on the metal magnetic particles in the magnetic base body. Other objects of the present invention will become apparent through the entire description of the specification.

According to one embodiment of the present invention, a magnetic base body includes a metal magnetic particle and an amorphous silicon oxide film provided on a surface of the metal magnetic particle, the amorphous silicon oxide film having a structural defect introduced therein.

In a magnetic base body according to one embodiment of the present invention, the amorphous silicon oxide film has a thickness of 100 nm or less.

In a magnetic base body according to one embodiment of the present invention, the amorphous silicon oxide film has a thickness of 50 nm or less.

In a magnetic base body according to one embodiment of the present invention, the metal magnetic particle contains 90 wt % or more Fe.

According to one embodiment of the present invention relates to an electronic component. The electronic component includes the magnetic base body.

An electronic component according to one embodiment of the present invention includes the magnetic base body and a coil provided in the magnetic base body. The coil may be embedded in the magnetic base body. The coil may also be provided on the magnetic base body so that at least a part of the coil is exposed to the outside of the magnetic base body.

According to the disclosure in the specification, it is possible to suppress the destruction of the insulating films provided on the metal magnetic particles contained in the magnetic base body.

DETAILED DESCRIPTION OF THE PREFERRED EMBODIMENTS

Figure 1:
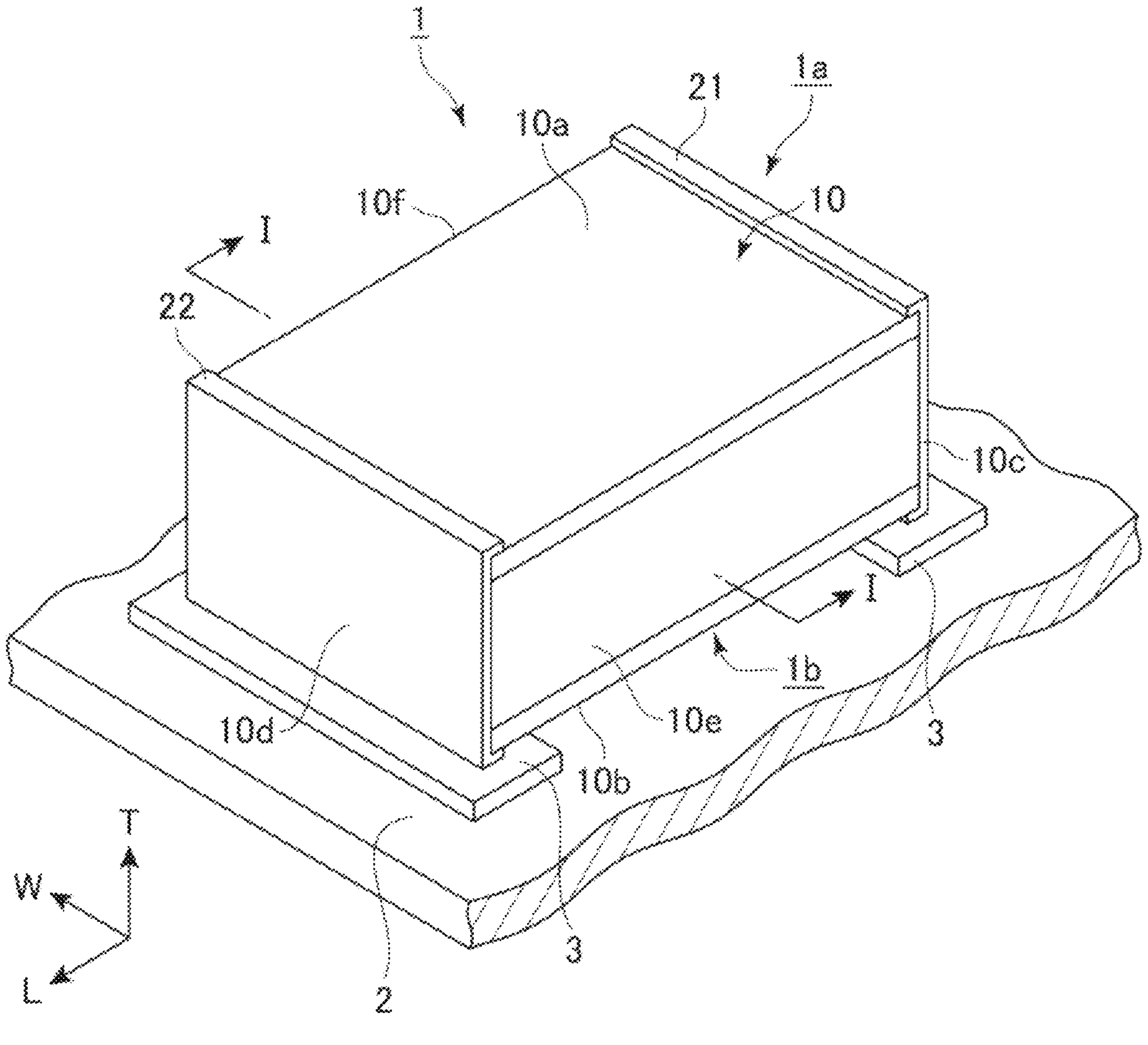
FIG. 1 shows a perspective view of a coil component according to an embodiment of the present invention.
Figure 2:
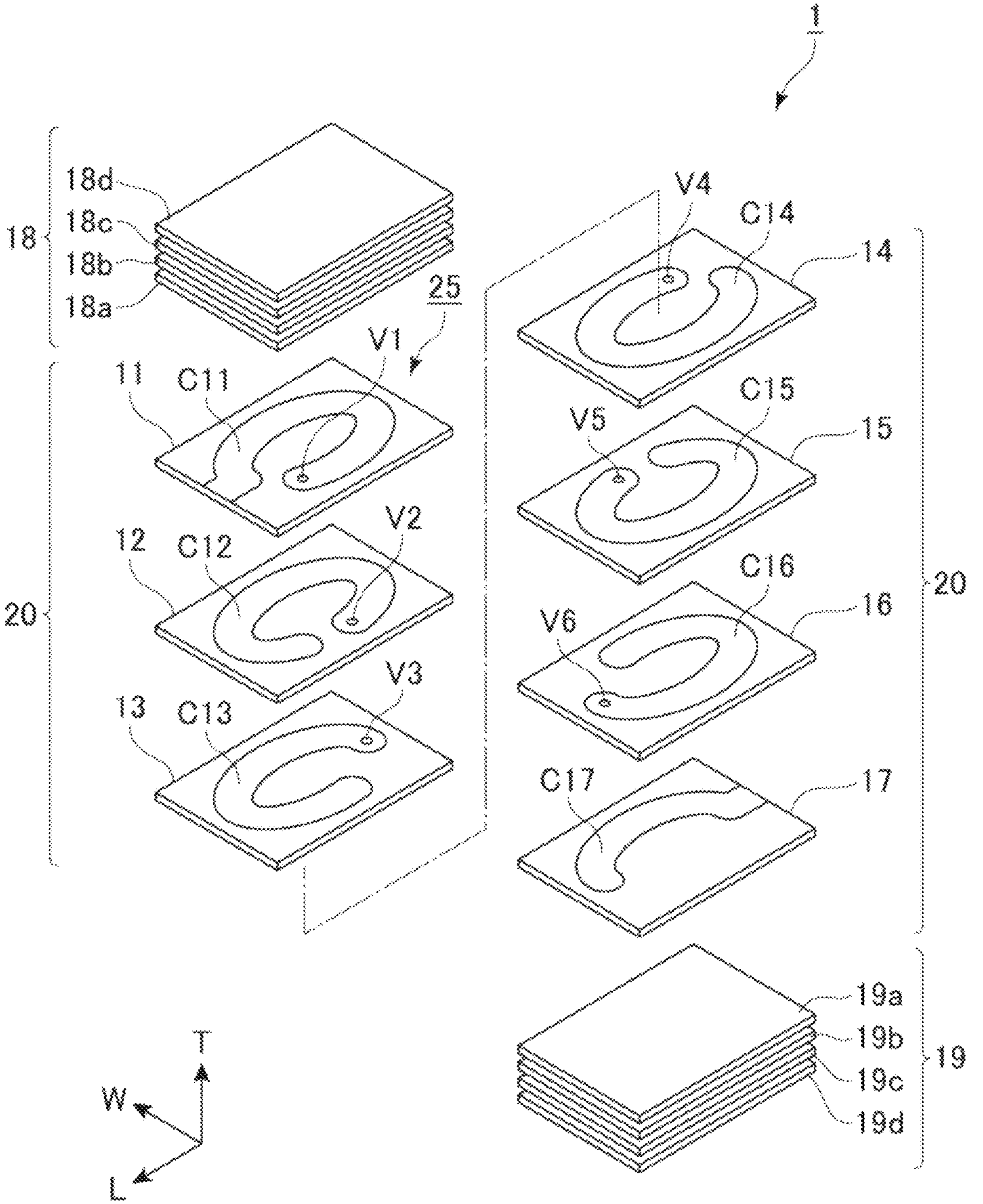
FIG. 2 shows an exploded perspective view of the coil component of FIG. 1.
Figure 3:
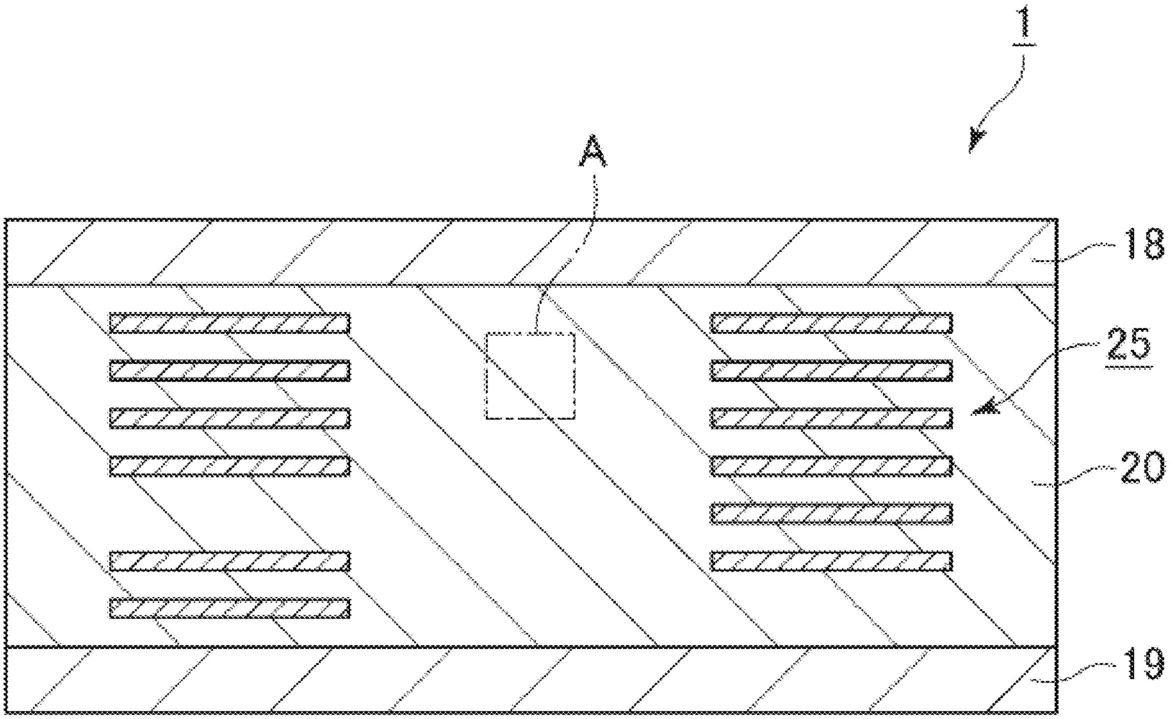
FIG. 3 shows typically the cross section of the coil component of FIG. 1, which cuts by I-I line

Referring to FIGS. 1 through to 3, an inductor 1 according to an embodiment of the present invention will be described. FIG. 1 is a perspective view of an inductor 1 according to an embodiment of the present invention. FIG. 2 is an exploded perspective view of the inductor 1 of FIG. 1. FIG. 3 shows typically the cross section of the inductor 1 of FIG. 1, which cuts by I-I line. In FIG. 2 to 4, the external electrodes are omitted for the convenience of explanation.

In the specification, the "length" direction, the "width" direction, and the "thickness" direction of the inductor 1 are indicated by the "L" direction, "W" direction and "T" direction in FIG. 1, except the case where it is otherwise defined in the context.

The inductor 1 shown in these figures is an example of a coil component, to which the present invention can be applied. The invention can be applied to transformers, filters, reactors, and various other coil components in addition to the inductor. The present invention is also applicable to coupled inductor, choke coils, and various other magnetically coupled coil components.

As shown, the inductor 1 is composed of a magnetic base body 10, a coil conductor 25 disposed in the magnetic base body 10, an external electrode 21 electrically connected to one end of the coil conductor 25, and external electrode 22 electrically connected to the other end of the coil conductor 25.

The magnetic base body 10 is formed of a magnetic material in a rectangular shape. The magnetic base body 10 includes a magnetic layer 20 with the coil 25 embedded, an upper cover layer 18 formed of a magnetic material provided on the top surface of the magnetic layer 20, and a lower cover layer 19 formed of a magnetic material disposed on the bottom surface of the magnetic layer 20. Depending on the manufacturing method of the magnetic base body 10, the boundary between the magnetic layer 20 and the upper cover layer 18 and the boundary between the magnetic layer 20 and the lower cover layer 19 may not be clearly confirmed. In one embodiment of the present invention, the magnetic base body 10 has a length (the dimension in the L direction) of 1.0 mm to 2.6 mm, a width (a dimension in the W direction) of 0.5 to 2.1 mm, and a height (the dimension in the H direction) of 0.5 to 1.0 mm. The dimension in the length direction also may be 0.3 mm to 1.6 mm.

The inductor 1 is mounted on a circuit board 2. Land portions 3 may be provided on the circuit board 2. In the case where the inductor 1 includes two external electrodes 21 and 22, the circuit board 2 is correspondingly provided with two land portions 3. The inductor 1 can be mounted on the circuit board 2 by bonding each of the external electrodes 21 and 22 to the corresponding land portions 3 of the circuit board 2. The circuit board 2 can be mounted on various electronic devices. Electronic devices on which the circuit board 2 can be mounted include smartphones, tablets, game consoles, and various other electronic devices. As described later, since the insulation property of the magnetic base body 10 has been improved, the inductor 1 can be miniaturized and/or thinned. Therefore, the inductor 1 can be suitably used to the circuit board 2, on which the components are mounted high-densely. The inductor 1 may also be a built-in component embedded in the circuit board 2.

The magnetic base body 10 has a first principal surface 10*a*, a second principal surface 10*b*, a first end surface 10*c*, a second end surface 10*d*, a first side surface 10*e*, and a second side surface 10*f*. The magnetic base body 10 has its outer surface defined by these six surfaces. The first principal surface 10*a* and the second principal surface 10*b* face each other; the first end surface 10*c* and the second end surface 10*d* face each other; and the first side surface 10*e* and the second side surface 10*f* face each other.

In the FIG. 1 since the first principal surface 10*a* is located on the upper side of the magnetic base body 10, the first principal surface 10*a* may be referred to as "upper surface". Similarly, the second principal surface 10*b* may be referred to as a "lower surface." Since the inductor 1 is such disposed that the second principal surface 10*b* is opposite to the circuit board 2, the second principal surface 10*b* may be referred to as a "mounting surface". When referring to the up-down direction of the inductor 1, the up-down direction of FIG. 1 is applied as a reference.

The external electrode 21 is provided on the first end surface 10*c* of the magnetic base body 10. The external electrode 22 is provided on the second end surface 10*d* of the magnetic base body 10. Each external electrode may extend to the upper and lower surfaces of the magnetic base body 10 as shown in figures. The shape and arrangement of each external electrode are not limited to the illustrated examples. For example, both of the external electrodes 21 and 22 may be provided on the lower surface 10*b* of the magnetic base body 10. In this case, the coil conductor 25 is connected to the external electrodes 21 and 22 provided on the lower surface 10*b* of the magnetic base body 10 through the via conductor. The external electrode 21 and the external electrode 22 are disposed apart from each other in the length direction. The distance between the external electrode 21 and the external electrode 22 is equal to or slightly smaller than 0.3 mm to 1.6 mm, which is the dimension in the length direction of the magnetic base body 10. As described later, since the insulating property of the magnetic base body 10 has been improved, the distance between the external electrode 21 and the external electrode 22 can be reduced to about 0.3 mm to 1.6 mm.

Next, the laminated structure of the inductor 1 will be further described principally with reference to FIG. 2. FIG. 2 shows an exploded perspective view of the inductor 1 produced by the lamination process. As shown in FIG. 2, the magnetic layer 20 has magnetic films 11 to 17. In the magnetic layer 20, the magnetic film 11, the magnetic film 12, the magnetic film 13, the magnetic film 14, the magnetic film 15, the magnetic film 16 and the magnetic film 17 are laminated sequentially from the positive direction side to the negative direction side of the T axis direction. The inductor 1 may be produced by methods other than the lamination process. For example, the inductor 1 may be produced by a thin film process. In addition, the inductor 1 may be a winding type coil, in which a winding is wound around the outside of the core.

Conductor patterns C11 to C17 are formed on the top surface of each of the magnetic films 11 to 17. The conductor patterns C11 to C17 are formed, for example, by printing a conductive paste made of a metal or alloy excellent in conductivity by screen printing method. Ag, Pd, Cu, Al or their alloys can be used as the material of the conductive paste. The conductor patterns C11 to C17 may be formed by other materials and methods. The conductor patterns C11 to C17 may be formed by, for example, a sputtering method, an inkjet method, or any other known methods.

Vias V1 to V6 are formed at predetermined positions of the magnetic film 11 to the magnetic film 16, respectively. The vias V1 to V6 are formed by forming through holes, which penetrate the magnetic film 11 to the magnetic film 16 in the T-axis direction at predetermined positions of the magnetic film 11 to the magnetic film 16, and filling the conductive material into the through holes.

Each of conductor patterns C11 to C17 is electrically connected to the adjacent conductor pattern through vias V1 to V6. The conductor patterns C11 to C17, thus connected, form the spiral coil conductor 25. That is, the coil conductor 25 has conductor patterns C11 to C17 and vias V1 to V6.

An end of the conductor pattern C11 opposite to the end, which is connected to the via V1, is connected to the external electrode 22. The end of the conductor pattern C17 opposite to the end that is connected to the via V6, is connected to the external electrode 21.

The upper cover layer 18 has magnetic films 18*a* to 18*d* made of the magnetic material, and the lower cover layer 19 has magnetic films 19*a* to 19*d* made of the magnetic material. In the specification, the magnetic films 18*a* to 18*d* and the magnetic films 18*a* to 18*d* may be collectively referred to as “cover layer magnetic films”.

As described above, the magnetic base body 10 (the magnetic films 11 to 17 and the cover layer magnetic films) is made of the magnetic material. A composite magnetic material can be used as the magnetic material for the magnetic base body 10, which includes bonding material and a plurality of metal magnetic particles. The inductor 1 may have two or more regions composed of different magnetic materials. For example, the magnetic layer 20 and the upper cover layer 18 may be formed of different magnetic materials.

An insulating film is formed on each of the metal magnetic particles contained in the composite magnetic material for the magnetic base body 10. This insulating film is an amorphous silicon oxide film. And as described later, a structural defect is introduced into the silicon oxide film.

Next, an example of a method of manufacturing the inductor 1 is described. The inductor 1 can be manufactured, for example, by a lamination process. Described below is an example of the manufacturing method of the inductor 1 by a lamination process.

First, magnetic sheets are formed that are used as magnetic films 18*a* to 18*d* constitutes the upper cover layer 18, the magnetic sheet having magnetic films 11 to magnetic films 17 constitutes the magnetic layer 20 and the magnetic sheet having magnetic films 19*a* to 19*d* constitutes the lower cover layer 19. These magnetic sheets are formed of a composite magnetic material, which contains a bonding material and a plurality of metal magnetic particles.

First, metal magnetic particles are prepared for preparation of a magnetic sheets. The metal magnetic particles for the magnetic sheets are formed of a crystalline or amorphous metal or alloy containing at least one of the elements of iron (Fe), nickel (Ni) and cobalt (Co). The metal magnetic particles may further contain at least one of the elements of silicon (Si), chromium (Cr) and aluminum (Al). The metal magnetic particles may also be particles made of pure iron consisting of Fe and unavoidable impurities, or may be an Fe-based amorphous alloy containing iron (Fe). Examples of the Fe-based amorphous alloys include Fe—Si alloy, Fe—Si—Al alloy, Fe—Si—Cr—B alloy, Fe—Si—B—C alloy and Fe—Si—P—B·-C alloy. The metal magnetic particles may include particles of only one type of metal or only one type of alloy. For example, all the first metal magnetic particles 31 may be particles made of pure iron or a specific type of Fe-based amorphous alloy. The metal magnetic particles contained in composite magnetic materials for magnetic base body 10 may include particles made of different types of metals or alloys. For example, the first metal magnetic particles 31 may include a plurality particles of pure iron and a plurality particles of Fe—Si alloy. When the metal magnetic particles are formed of pure iron or an alloy containing Fe, the metal magnetic particles may contain 90 wt % or more Fe. Thereby, a magnetic base body 10 having good magnetic saturation characteristics is obtained. The materials for metal magnetic particles may be carbonyl iron powder containing 99.9 wt % or more Fe.

In one embodiment, the metal magnetic particles have an average particle size of 1 μm to 200 μm. The metal magnetic particles may contain two or more types of metal magnetic particles having different average particle sizes. For example, the metal magnetic particles for composite magnetic material may have first metal magnetic particles having a first average particle size, and second metal magnetic particles having a second average particle size, which is smaller than the first average particle size. In one embodiment, the average particle size of the second metal magnetic particles is 1/10 or less of the average particle size of the first metal magnetic particles. When the average particle size of the second metal magnetic particles is 1/10 or less of the average particle size of the first metal magnetic particles, the second metal magnetic particles easily enter the gap between the adjacent first metal magnetic particles 31, and as a result, the filling factor (the density) of metal magnetic particles in the magnetic base body 10 is increased. In one embodiment, the metal magnetic particles in the composite magnetic material for the magnetic base body 10 may further include third metal magnetic particles having a third average particle size, which is smaller than the second average particle size. The average particle size of the third metal magnetic particles may be 0.5 μm or less. As a result, even when the coil component is excited at a high frequency, generation of eddy current in the third metal magnetic particle can be suppressed Thereby, the coil component 10 which has the outstanding high frequency characteristic is obtained.

The determination of the average particle sizes of the metal magnetic particles contained in the composite magnetic material is obtained by cutting the magnetic base body along the thickness direction (T direction) to expose a cross section, scanning the cross section with Scanning Electron Microscope (SEM), and photographing the cross section. When the particles have a particle size of 1 μm or more, photograph is taken at a magnification of 2,000 to 5,000 times, and when the particles have a particle size of 1 μm or less, photograph is taken at 5000 to 10000 times. The particle size distribution is determined according to the photographs, and an average particle size of metal magnetic particles is determined according to a particle size distribution. For example, the 50% value of the particle size distribution determined based on the SEM photograph is taken as the average particle sizes of the metal magnetic particles.

Insulating films are formed on the surfaces of the metal magnetic particles in order to prevent short circuit between the metal magnetic particles. The insulating films are preferably formed to cover the entire surface of the metal magnetic particles. As described above, when the metal magnetic particles are of three types of different average particle sizes, it is desirable that the particle powder having an average particle size of 1 μm or more be provided with insulating films, and the metal magnetic particles having sizes smaller than 1 μm or the third metal magnetic particles having the smallest average particle size may not be provided with insulating films. This is because metal magnetic particles having a sufficiently small average particle size have a slight effect on eddy current loss even if they are short-circuited with other metal magnetic particles.

In one embodiment, the insulating films provided on the surfaces of the metal magnetic particles are amorphous silicon oxide films, in which a structural defect is introduced. The amorphous silicon oxide films, into which the structural defect is introduced, is provided on the surface of each of the metal magnetic particles as follows. First, for example, an $SiO_2$ layer is formed on each surface of the metal magnetic particles by a coating process using a sol-gel method. Specifically, firstly, a treatment liquid containing TEOS (Tetraethoxysilane, $Si(OC_2H_5)_4$), ethanol and water is mixed with a mixture of liquids containing metal magnetic particles, ethanol, and ammonia water; the mixed treatment liquid is stirred; the stirred mixture is filtered; and, by filtering the stirred mixed liquid, metal magnetic particles each having $SiO_2$ on the surface thereof are separated. In one embodiment, the thickness of the $SiO_2$ layer formed on the surfaces of the metal magnetic particles is 100 nm or less, when the average particle size of the metal magnetic particles is 200 μm or less. The thickness of the $SiO_2$ layer provided on the metal magnetic particles can be changed according to the average particle size of the metal magnetic particles.

Next, heat treatment is performed to the metal magnetic particles, on which the $SiO_2$ layer is formed, under a reducing atmosphere. The heat treatment was performed with $H_2$ gas atmosphere for 20-60 minutes at 400-800° C. The temperature and time of the heat treatment may be appropriately set in accordance with the thickness of the $SiO_2$ layer so that the $SiO_2$ layer is sintered as an amorphous silicon oxide film instead of crystalline. Further, the hydrogen concentration, temperature, and time of the heat treatment may be appropriately set according to the component and the average particle size of the metal magnetic particles in order to suppress the oxidation of the metal magnetic particles. The $SiO_2$ layer formed on the surface of the metal magnetic particles has the function of suppressing the bonding between the metal particles by the above heat treatment. Therefore, thanks to the $SiO_2$ layer formed on the surface of the metal magnetic particles, the heat treatment can be performed at a temperature higher than the case where the $SiO_2$ layer is not formed. As described above, since the problem of bonding between particles is alleviated in the heat treatment step, various materials can be used as the metal magnetic particles. As the reducing atmosphere gas, various other reducing atmosphere gases such as $H_2$ diluted with nitrogen or argon may be used, besides $H_2$ gas.

By performing heat treatment under a reducing atmosphere, the $SiO_2$ layer is sintered to form an amorphous silicon oxide film, and N, O, and/or C are discharged from the metal magnetic particles during the formation of the silicon oxide film. It is considered that since the formation of the amorphous silicon oxide film and the discharge of N, O, and/or C from the inside of the metal magnetic particles occur in parallel in the initial process of the heat treatment, the gases including N, O, and/or C discharged from the metal magnetic particles are carried into the silicon oxide film as tiny bubbles. The silicon oxide film thus formed is amorphous silica, which has a structural defect of bubbles. That is, a structural defect is introduced into the amorphous silicon oxide film (amorphous silica film) by heat treatment under a reducing atmosphere. Such an amorphous silicon oxide film (amorphous silicon film) having a structural defect has flexibility following deformation of the metal magnetic particles due to forming pressure or the like because the structural defect is introduced. Since the amorphous silicon oxide film has a structural defect of bubbles and thus has a lower hardness than that of a silicon oxide film having no structural defect, it is easy for the amorphous silicon oxide film to follow the deformation of the metal magnetic particles. Further, when the metal magnetic particles are deformed by the formation pressure, the amorphous silicon oxide film is deformed in accordance with the deformation requirement of the metal magnetic particles to fill the gap between the metal magnetic particles. Therefore, the adhesion between the metal magnetic particles can be improved by the amorphous silicon oxide film.

Comparing the film thickness of the $SiO_2$ layer before the heat treatment under the reducing atmosphere and the film thickness of the amorphous silicon oxide film after the heat treatment, the film thickness of the silicon oxide film after the heat treatment is a thickness of about 1.2 to 1.6 times of the film thickness of the $SiO_2$ layer before the heat treatment. This times rate varies depending on the processing temperature. It is confirmed that when the film thickness of the $SiO_2$ layer before the heat treatment is 50 nm, the film thickness of the silicon oxide film after the heat treatment is about 70 nm. The change in the thickness of the film also varies depending on the thickness of the $SiO_2$ layer. Specifically, the thinner the film thickness of the $SiO_2$ layer before the heat treatment, the smaller the change, and the thicker the film thickness of the $SiO_2$ layer before the heat treatment, the bigger the change. For example, when the $SiO_2$ layer is 17 nm, the film thickness of the silicon oxide film after the heat treatment is about 20 nm, and when the $SiO_2$ layer is 63 nm before the heat treatment, the film thickness of the silicon oxide film after the heat treatment is about 100 nm. By setting the film thickness of the silicon oxide film from 20 nm to 100 nm, it is possible to have flexibility to follow the deformation of the metal magnetic particles and it is possible for the silicon oxide film to continuously exist on the surface of the metal magnetic particles. Such an amorphous silicon oxide film can insulate metal magnetic particles from other metal magnetic particles.

Figure 4A:
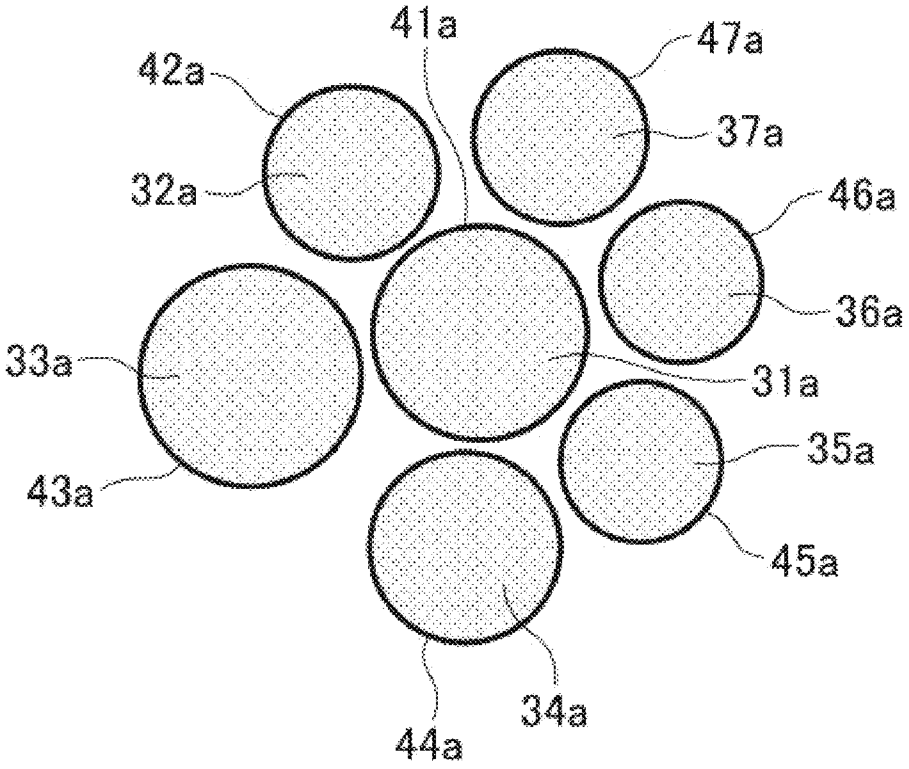
FIG. 4A shows typically the metal magnetic particles contained in the slurry before pressure forming.

Next, the metal magnetic particles, on which the amorphous silicon oxide film has been formed as described above, and the binder are kneaded to form a slurry. FIG. 4A shows a portion of the metal magnetic particles dispersed in the slurry. FIG. 4A shows seven metal magnetic particles 31*a* to 37*a*. As shown in the figure, silicon oxide films 41*a* to 47*a* are provided on the respective surfaces of the metal magnetic particles 31*a* to 37*a*. As described above, the silicon oxide films 41*a* to 47*a* are amorphous silicon oxide films (amorphous silicon), in which a structural defect is introduced into the films. The structural defect is introduced into the silicon oxide films 41*a* to 47*a*, and the silicon oxide films 41*a* to 47*a* can be deformed following the deformation of the metal magnetic particles 31*a* to 37*a* during the forming process of the silicon oxide, described later. In the present embodiment, the thickness of $SiO_2$ layer formed on the surface of the metal magnetic particles is set to 100 nm or less. The purpose of setting the thickness of $SiO_2$ layer to 100 nm or less is in order to introduce the structural defect into the silicon oxide films 41*a* to 47*a*, and the deformation of the silicon oxide films 41*a* to 47*a* follows the deformation of the metal magnetic particles 31*a* to 37*a*. If the $SiO_2$ layer is thicker than this, the structural defect introduced to the silicon oxide films 41*a* to 47*a* in the heat treatment under the reducing atmosphere may not be sufficient to secure the flexibility of the silicon oxide films 41*a* to 47*a*. As described above, according to the experiment and observation of the present inventor, it is known that when the heat treatment is performed at 400 to 800° C. for 20 to 60 minutes with $H_2$ gas atmosphere, the structural defect can be introduced in the range from the surface to 50 nm. Therefore, by setting the thickness of the $SiO_2$ layer formed on the surface of the metal magnetic particles to 50 nm or less, the structural defect can be introduced into the entire region in the thickness direction of the silicon oxide films 41*a* to 47*a*.

The bonding material contained in the composite magnetic materials is a thermosetting resin. For example, excellent in insulation, such as, an epoxy resin, a phenol resin, a polyimide resin, a silicone resin, a polystyrene (PS) resin, a high density polyethylene (HDPE) resin, Polyoxymethylene (POM) resin, polycarbonate (PC) resin, polyvinylidene fluoride (PVDF) resin, phenol (Phenolic) resin, polytetrafluoroethylene (PTFE) resin, polybenzoxazole (PBO) resin, polyvinyl alcohol (PVA) resin, polyvinyl butyral (PVB) resin, or acrylic resin.

Next, the above slurry is placed in a molding die and a forming pressure is applied to obtain a plate-like magnetic sheet. The magnetic sheet may be formed by hot forming or cold forming. In the case of hot forming, the forming is performed at a hot temperature higher than the curing temperature of the bonding material, and the temperature shall not affect the crystallization of the metal magnetic particles. For example, in hot forming, the forming is performed in a hot temperature ranging from 150° C. to 400° C. The forming pressure is, for example, 40 MPa to 120 MPa. The forming pressure can be adjusted appropriately to obtain a desired filling factor.

The pressure treatment for obtaining the magnetic sheet may be performed collectively on a plurality of sheets. Specifically, the above-mentioned slurry is applied to the surface of a plastic base film to be dried, and the dried slurry is cut into a predetermined size to form a sheet body. It is also possible to pressurize the layer body obtained by a plurality of laminations of the sheet bodies.

Next, a coil conductor is provided to the magnetic sheet produced as described above. Specifically, a through hole penetrating each of the magnetic sheets in the T-axis direction is formed at a predetermined position of each of the magnetic sheets to be the magnetic film 11 to the magnetic film 16. Next, a conductive paste is painted on the upper surface of each of the magnetic sheets to be formed to the magnetic film 11 to the magnetic film 17 by a screen printing method to form a conductor pattern on the magnetic sheets. In addition, the conductive paste is embedded in each through hole formed in each magnetic sheet. In this way, the conductor patterns formed on the first magnetic sheets of the magnetic film 11 to the magnetic film 17 become the conductor patterns C11 to C17, respectively, and the metals buried in the respective through holes become vias V1 to V6. Each conductor pattern can be formed by various known methods other than the screen printing method.

Next, each first magnetic sheet to be formed to the magnetic film 11 to the magnetic film 17 are laminated to obtain a coil laminate. Each magnetic sheet to be formed to the magnetic film 11 to the magnetic film 17 is laminated to be electrically connected to the conductor pattern adjacent to each of the conductor patterns C11 to C17 formed on each magnetic sheet via the vias V1 to Va6.

A plurality of magnetic sheets are laminated to form an upper laminate of the upper cover layer 18. Further, a plurality of magnetic sheets are laminated to form a lower laminate to be the lower cover layer 19.

Then, the lower laminate, the coil laminate, and the upper laminate are sequentially stacked in the positive direction side from the negative direction side in the T-axis direction, and the laminated laminates are heat-pressed by a compressor to obtain a principal laminated layer body. The principal laminated layer body may be also formed by sequentially laminating all the plurality of prepared magnetic sheets by heat pressing instead of forming the lower laminate, the coil laminate, and the upper laminate.

Next, the principal laminated layer body is cut into a desired size by using a cutter such as a sewing machine or a laser processing machine to obtain a chip laminated body. Next, the chip laminate body is degreased and the degreased chip layer body is heat treated. The end portion of the chip laminated body is subjected to a polishing treatment such as barrel polishing if necessary.

Next, the external electrode 21 and the external electrode 22 are formed by applying a conductive paste to both ends of the chip laminated body. At least one of a solder barrier layer and a solder wetting layer may be formed on the external electrode 21 and the external electrode 22 if necessary. Thus, the inductor 1 is obtained.

A part of the works included in the above manufacturing method can be omitted as appropriate. In the manufacturing method of the inductor 1, some processes, which are not explicitly described in the present specification, can be performed as needed. A part of each process included in the manufacturing method of the above-mentioned inductor 1 may be performed by changing the order as needed, without departing from the spirit of the present invention. Some of the steps included in the manufacturing method of the inductor 1 described above may be performed simultaneously or in parallel, if possible.

Figure 4B:
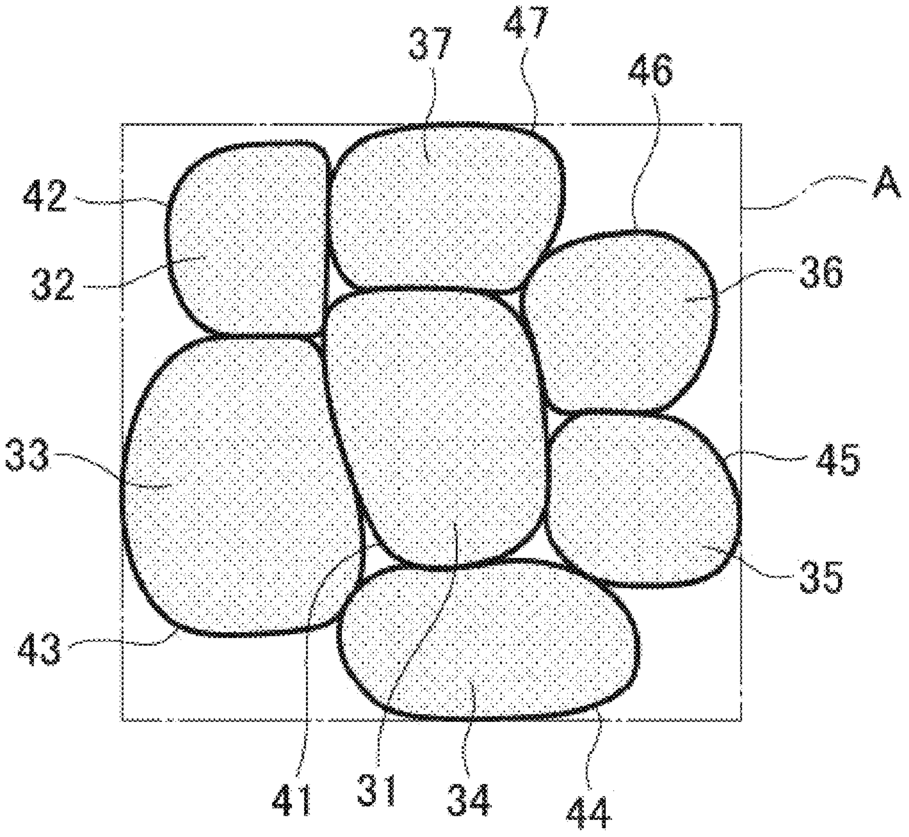
FIG. 4B shows typically the expanded area A of the magnetic base body shown by FIG. 3.

FIG. 4B is an enlarged view schematically showing a region A (see FIG. 3) of a cross section obtained by cutting, along the TW surface, the magnetic base body 10 of the inductor 1 formed as described above. The metal magnetic particles 31 to 37 contained in the magnetic base body 10 are obtained by deforming the metal magnetic particles 31*a* to 37*a* contained in the slurry before pressure forming by the pressure applied during forming. The slurry before pressure forming is shown in FIG. 4A. The surfaces of the metal magnetic particles 31 to 37 are provided with silicon oxide films 41 to 47, respectively. When the magnetic sheet is formed, the silicon oxide films 41 to 47 are obtained by the deformation of the silicon oxide films 41*a* to 47*a* following the deformation of the metal magnetic particles 31*a* to 37*a*.

As shown in FIG. 4A, in the slurry before forming, a gap is present between the adjacent metal magnetic particles 31*a* to 37*a*. This gap is filled with the bonding material. On the other hand, in the magnetic base body 10, the metal magnetic particles 31 to 37 are more closely packed by the pressure applied at the time of forming. In one embodiment, each of the metal magnetic particles 31 to 37 is in close contact with at least one of the adjacent metal magnetic particles. The pressure applied at the time of forming is set so that each of the metal magnetic particles 31 to 37 is in contact with at least one of adjacent metal magnetic particles via the silicon oxide films 41 to 47. In the embodiment shown in FIG. 4B, for example, the metal magnetic particle 31 is in contact with each of the adjacent metal magnetic particles 32 to 37 by the silicon oxide films 41 to 47.

It is considered that the thickness of the silicon oxide films 41 to 47 is almost the same as the thickness of the silicon oxide films 41*a* to 47*a* before sintering. The change in film thickness can be confirmed via a scanning electron microscope (SEM), by measurement of the particle cross section before and after the heat treatment. Therefore, in one embodiment, the thickness of the silicon oxide films 41 to 47 is set to 100 nm or less. In another embodiment, the thickness of the silicon oxide films 41 to 47 is set to 50 nm or less. The magnetic base body 10 is cut, in the thickness direction (T direction) of the silicon oxide films 41 to 47, to expose a cross section, which is measured base on the photographs taken by a scanning electron microscope (SEM) at a magnification of 50,000 to 100,000 times. For example, the thickness of the insulating layer provided on one metal magnetic particles shown in the SEM photograph is the dimensions of the insulating layer in a direction along the imaginary line that connects the geometric center of gravity of the one metal magnetic particle and the geometric center of gravity of the other metal magnetic particles adjacent to the metal magnetic particles shown in the SEM photograph. The thickness of the insulating layer provided on one metal magnetic particle in the SEM photograph may be determined by the dimensions of the insulating layer along the imaged straight line extending from the geometric center of gravity (the center of figure) of the one metal magnetic particle in the SEM photograph in the up-down direction. In this case, since the dimension at a position above the center of gravity and the dimension at a position below the center of gravity are measured, this average may be taken as the thickness of the insulating layer of the metal magnetic particle. When there is a plurality of first metal magnetic particles in the SEM photograph, the thickness of the insulating layer may be determined for each of the plurality of the metal magnetic particles, and the average value may be taken as the thickness of the insulating layer provided in the first metal magnetic particles in the magnetic base body.

The introduction of the defect in the silicon oxide films 41 to 47 can be confirmed by cutting the magnetic base body to expose a cross section and observing the cross section with a transmission electron microscope (TEM). Specifically, the cross section is irradiated with an electron beam at an acceleration voltage of 5V, a cross section photograph is taken at a magnification of 100,000 times, the regions in which the defect is introduced into the silicon oxide films 41 to 47 are reflected darker than that of the other regions. Since such a dark region exists, the existence of structural defect in the silicon oxide films 41 to 47 can be confirmed. The area where the structural defect is introduced into the film appears dark because the area is damaged by the electron beam irradiation at the time of photographing.

When the metal magnetic particles 31 to 37 and the silicon oxide films 41 to 47 are compared, the composition components, particularly the oxygen content, are different. Therefore, by analyzing the composition components in each region of the cross section of the magnetic base body 10, the boundaries of the metal magnetic particles 31 to 37 and the corresponding silicon oxide films 41 to 47 can be determined.

EXAMPLES

Next, an example of the present invention will be described. First, metal magnetic particles made of pure iron (99.92 wt % Fe) and having an average particle size of 5 μm were prepared, and a $SiO_2$ film was formed on the metal magnetic particles to a thickness of 50 nm by a sol-gel method. Next, the metal magnetic particles formed with the $SiO_2$ film were subjected to heat treatment under a $H_2$ atmosphere at 700° C. for 60 minutes to form metal magnetic particles having an amorphous silicon oxide film, into which a structural defect is introduced. Next, metal magnetic particles provided with an amorphous silicon oxide film and polyvinyl butyral were mixed to prepare a slurry. Subsequently, the slurry was placed in a molding die, and a predetermined forming pressure was applied to prepare a plurality of plate-like magnetic sheets. As the forming pressure is concerned, three pressures of 40 MPa, 80 MPa, and 120 MPa were used Thereby, three types of magnetic material sheets molded at different forming pressures were obtained. For convenience of explanation, a magnetic sheet formed at a forming pressure of 40 MPa is referred to as a first magnetic sheet, and a magnetic sheet formed at a forming pressure of 80 MPa is referred to as a second magnetic sheet, and a magnetic sheet formed at a forming pressure of 120 MPa is referred to as a third magnetic sheet. Next, a through hole for the via conductor is provided at a predetermined position of the magnetic sheet thus produced. Next, a conductive paste containing Cu was embedded in the through hole, and a conductive paste containing Cu was painted on a surface of each magnetic sheet in a predetermined pattern. In this manner, the magnetic sheets, on which the conductive patterns are formed, are laminated so that the adjacent conductor patterns are electrically connected to each other through the conductors embedded in the through holes to obtain a laminate. This laminate includes three types of laminates according to the type of magnetic sheet used. That is, the first laminate is formed by laminating the first magnetic sheet on which the conductor pattern is formed, and the second laminate is formed by laminating the second magnetic sheet on which the conductor pattern is formed, and the third laminate is formed by laminating the third magnetic sheet on which the conductor pattern is formed. Subsequently, the laminate was cut into pieces using a dicing machine to obtain a chip laminate. The chip laminate thus obtained was heated at 650° C. for 30 minutes under an $H_2$ gas atmosphere. Next, a set of external electrodes is formed by applying a conductor paste to both ends of the heated chip laminate. Three kinds of inductors were obtained by plating this external electrode with nickel and Sn. In these three types of inductors, the forming pressure used when forming the magnetic sheet, which constitutes each magnetic base body, were different from each other.

It was confirmed that, when a cross section obtained by cutting each of the three types of inductors created in above manner along the T-axis direction was observed at a magnification of 50,000 times with an SEM, a thin film of about 50 nm on the surfaces of the metal magnetic particles had a substantially uniform thickness. It was confirmed by SEM-EDS mapping that the thin film on the surface of the metal magnetic particles was an amorphous silicon oxide film.

In addition, the cross section of each of the above three types of inductors was photographed using a TEM at a magnification of 100,000 times. During observation with a TEM, an electron beam was irradiated at an accelerating voltage of 5 V to the cross section of the inductor. In the TEM photograph thus obtained, a black dot-like pattern was observed in the region of the silicon oxide film. From this, it was confirmed that the structural defect, which is damaged by the electron beam, was introduced into the silicon oxide film.

Further, for the inductor obtained as described above, an impedance analyzer (E4991A manufactured by Keysight Technologies Inc.) was used to measure the magnetic permeability and the Q value in 0.1 MHz to 100 MHz. As a result, the magnetic permeability of the inductor made of the magnetic sheets produced under the forming pressures of 40 MPa, 80 MPa, and 120 MPa were 30, 55, and 66, respectively. For each inductor, a peak of the Q value appears in the frequency domain above 1 MHz. Thereby, insulation between particles in a high frequency domain can be ensured.

Next, the effects of the above embodiments will be described. According to the magnetic base body 10 of the above-described embodiment, in order to prevent short-circuit between the adjacent metal magnetic particles 31 to 37, amorphous silicon oxide films 41 to 47 are provided on the surfaces of the respective metal magnetic particles 31 to 37. The amorphous silicon oxide films 41 to 47 are made of amorphous silica into which structural defect is introduced. This structural defect is considered to be caused when the $SiO_2$ layer is incinerated under a reducing atmosphere to produce amorphous silica, the gas containing N, O, and/or C discharged from the metal magnetic particles is sucked into the amorphous silica as bubbles. In the magnetic base body 10 of the above embodiment, structural defect is introduced into the silicon oxide films 41 to 47, so that the silicon oxide films 41 to 47 have flexibility. Therefore, the silicon oxide films 41 to 47 are easily deformed due to the structural defect in the films. Therefore, when the metal magnetic particles 31 to 37 are deformed by the forming pressure applied at the time of forming of the magnetic base body 10, the silicon oxide films 41 to 47 can also be deformed following the deformation of the metal magnetic particles 31 to 37. Therefore, the silicon oxide films 41 to 47 are not easily broken at the time of forming. Thereby, the destruction of the silicon oxide films 41 to 47 due to the forming pressure applied during the forming of the magnetic base body 10 can be suppressed, and as a result, the short circuit between the adjacent metal magnetic particles 31 to 37 can be prevented. Thereby, in the magnetic base body 10 in the above embodiment, the occurrence of eddy current loss is suppressed.

In the above embodiment, each of the metal magnetic particles 31 to 37 is in close contact with at least one of the other adjacent metal magnetic particles via the silicon oxide films 41 to 47 without any gap. At this time, the distance between the adjacent metal magnetic particles (the distance between the outer surface of a metal magnetic particle and the outer surface of the metal magnetic particle adjacent to the metal magnetic particle) is equivalent to two layers of silicon oxide film. As described above, in the above embodiment, the distance between the adjacent metal magnetic particles can be reduced to the thickness of about two silicon oxide films, therefore the filling factor of the metal magnetic particles 31 to 37 in the magnetic base body 10 can be improved.

In one embodiment described above, the third metal magnetic particle is further provided having a third average particle size smaller than the second average particle size, and a third insulating layer is formed on the surface thereof. The third metal magnetic particles 33 can further increase the filling factor of the metal magnetic particles in the magnetic base body 10. In addition, the third metal magnetic particles 33 enter into the gaps between the first metal magnetic particles 31, between the second metal magnetic particles 32, and between the first metal magnetic particles 31 and the second metal magnetic particles 32 to increase the mechanical strength of magnetic base body 10. Therefore, the third metal magnetic particles 33 have a smaller third average particle size than that of the first metal magnetic particles 31 and the second metal magnetic particles 32. Although they have little influence on the magnetic saturation characteristics of the magnetic base body 10, it contributes to improving the filling factor of the magnetic base body 10 and improving the mechanical strength of the magnetic base body 10.

According to the above embodiment, the filling factor of the metal magnetic particles in the magnetic base body 10 can be improved, so that the inductor 1 having a high inductance can be obtained.

The dimensions, materials, and configurations of the various constituent elements described in the specification are not limited to the described embodiments, and the various constituent elements may be modified to have any dimensions, materials, and configurations included in the present invention. Further, constituent elements that are not explicitly described in the present specification may be added to the illustrated embodiments, and a part of the constituent elements in the respective embodiments may be omitted.

What is claimed is:

1. A magnetic base body, comprising:

a first metal magnetic particle having on a surface thereof a first amorphous silicon oxide film;

a second metal magnetic particle having on a surface thereof a second amorphous silicon oxide film, the second metal magnetic particle being adjacent to the first metal magnetic particle;

a third metal magnetic particle having on a surface thereof a third amorphous silicon oxide film, the third metal magnetic particle being adjacent to the first metal magnetic particle and the second metal magnetic particle; and a binder between the first amorphous silicon oxide film, the second amorphous silicon oxide film and the third amorphous silicon oxide film, the binder consisting of a thermosetting resin material, wherein each of the first and second amorphous silicon oxide films has a structural defect introduced therein, wherein the first amorphous silicon oxide film and the second amorphous silicon oxide film are in direct contact with each other to bond the first and second metal magnetic particles together, wherein the structural defect is configured to appear darker than a region of the first and second amorphous silicon oxide films having no structural defect when observed by photographing a cross section of the magnetic base body at a magnification of 100,000 times using a transmission electron microscope that irradiates the cross section with an electron beam at an accelerating voltage of 5V, wherein the first and second amorphous silicon oxide films have a thickness of 100 nm of less, and wherein the structural defect includes bubbles, the bubbles being introduced into an entire region in a thickness direction of the first and second amorphous silicon oxide films.

2. The magnetic base body according to claim 1, wherein the first and second amorphous silicon oxide films have a thickness of 50 nm or less.

3. The magnetic base body according to claim 1, wherein the first and second amorphous silicon oxide films have a thickness of 20 nm or more.

4. The magnetic base body according to claim 1, wherein the first and second metal magnetic particles contain 90 wt % or more Fe.

5. An electronic component comprising the magnetic base body according to claim 1.

6. An electronic component comprising:

the magnetic base body according to claim 1; and a coil provided in the magnetic base body.

7. The magnetic base body according to claim 1, wherein the structural defect is configured to be a black dot-like pattern that is observed by photographing the cross section of the magnetic base body at the magnification of 100,000 times using the transmission electron microscope that irradiates the cross section with the electron beam at the accelerating voltage of 5V.

8. A magnetic base body, comprising:

a first metal magnetic particle having on a surface thereof a first amorphous silicon oxide film;

a second metal magnetic particle having on a surface thereof a second amorphous silicon oxide film, the second metal magnetic particle being adjacent to the first metal magnetic particle;

a third metal magnetic particle having on a surface thereof a third amorphous silicon oxide film, the third metal magnetic particle being adjacent to the first metal magnetic particle and the second metal magnetic particle; and a binder between the first amorphous silicon oxide film, the second amorphous silicon oxide film and the third amorphous silicon oxide film, wherein each of the first and second amorphous silicon oxide films has a structural defect introduced therein, wherein the first amorphous silicon oxide film and the second amorphous silicon oxide film are in direct contact with each other to bond the first and second metal magnetic particles together, wherein the structural defect is configured to appear darker than a region of the first and second amorphous silicon oxide films having no structural defect when observed by photographing a cross section of the magnetic base body at a magnification of 100,000 times using a transmission electron microscope that irradiates the cross section with an electron beam at an accelerating voltage of 5V, wherein the first and second amorphous silicon oxide films have a thickness of 100 nm of less, wherein the structural defect includes bubbles, the bubbles being introduced into an entire region in a thickness direction of the first and second amorphous silicon oxide films, and wherein the binder is made from an epoxy resin, a phenol resin, a polyimide resin, a silicone resin, a polystyrene (PS) resin, a high density polyethylene (HDPE) resin, Polyoxymethylene (POM) resin, polycarbonate (PC) resin, polyvinylidene fluoride (PVDF) resin, phenol (Phenolic) resin, polytetrafluoroethylene (PTFE) resin, polybenzoxazole (PBO) resin, polyvinyl alcohol (PVA) resin, polyvinyl butyral (PVB) resin, or acrylic resin.

9. The magnetic base body according to claim 8, wherein the first and second amorphous silicon oxide films have a thickness of 50 nm or less.

10. The magnetic base body according to claim 8, wherein the first and second amorphous silicon oxide films have a thickness of 20 nm or more.

11. The magnetic base body according to claim 8, wherein the first and second metal magnetic particles contain 90 wt % or more Fe.

12. An electronic component comprising the magnetic base body according to claim 8.

13. An electronic component comprising:

the magnetic base body according to claim 8; and a coil provided in the magnetic base body.

14. The magnetic base body according to claim 8, wherein the structural defect is configured to be a black dot-like pattern that is observed by photographing the cross section of the magnetic base body at the magnification of 100,000 times using the transmission electron microscope that irradiates the cross section with the electron beam at the accelerating voltage of 5V.

* * * * *